United States Patent [19]

Lovin

[11] Patent Number: 5,427,645

[45] Date of Patent: Jun. 27, 1995

[54] APPARATUS AND METHOD FOR RADIO FREQUENCY SEALING THERMOPLASTIC FILMS TOGETHER

[75] Inventor: Joseph R. Lovin, Greer, S.C.

[73] Assignee: W. R. Grace & Co.-Conn., Duncan, S.C.

[21] Appl. No.: 958,150

[22] Filed: Oct. 8, 1992

Related U.S. Application Data

[63] Continuation-in-part of Ser. No. 871,928, Apr. 21, 1992, which is a continuation-in-part of Ser. No. 805,350, Dec. 9, 1991, abandoned.

[51] Int. Cl.$^6$ .............................................. B32B 31/00
[52] U.S. Cl. ................................... 156/367; 156/378; 156/380.3; 333/32; 219/765
[58] Field of Search ................ 156/379.6, 379.8, 380.2, 156/380.3, 380.4, 380.5, 380.6, 380.7, 380.8, 367, 350, 378; 333/32; 219/10.41, 10.55 B, 482, 490, 497, 503, 506, 765

[56] References Cited

U.S. PATENT DOCUMENTS

| | | | |
|---|---|---|---|
| 2,609,482 | 9/1952 | Young. | |
| 2,667,437 | 1/1954 | Zoubek | 156/274.4 X |
| 2,816,596 | 12/1957 | Welch, Jr. | 154/42 |
| 2,883,505 | 4/1959 | Manwaring | 156/274.4 X |
| 2,957,944 | 10/1960 | De Monte | 333/32 |
| 3,052,590 | 9/1962 | Maros et al. | |
| 3,596,035 | 7/1971 | Meenen. | |
| 3,832,648 | 8/1974 | McDowell | 331/74 |
| 4,007,350 | 2/1977 | Gillet. | |
| 4,034,289 | 7/1977 | Rozylowicz | 324/95 |
| 4,124,427 | 11/1978 | Vecchiotti | 156/217 |

(List continued on next page.)

FOREIGN PATENT DOCUMENTS

| | | |
|---|---|---|
| 485212 | 4/1949 | Belgium. |
| 642140 | 4/1964 | Belgium. |
| 0424948 | 5/1991 | European Pat. Off.. |
| 1139565 | 7/1957 | France. |
| 1515148 | 3/1968 | France. |
| 59-198117 | 11/1984 | Japan. |
| 62-261423 | 11/1987 | Japan. |
| 3201400 | 9/1991 | Japan. |
| 611645 | 11/1948 | United Kingdom. |
| 577719 | 5/1956 | United Kingdom. |
| 839985 | 6/1960 | United Kingdom. |
| 1099365 | 1/1968 | United Kingdom. |
| 2198082 | 6/1988 | United Kingdom. |
| 1370724 | 1/1988 | U.S.S.R.. |

OTHER PUBLICATIONS

Perry's *Chemical Engineers' Handbook* 5th ed., published 1973, McGraw-Hill, 23–62, 23–63.
Wave Characteristics on Field and Wave Elect 390–395.
Soudure Du PVC Par Electronique Ind Apr. 1969.

*Primary Examiner*—Chester T. Barry
*Attorney, Agent, or Firm*—William D. Lee, Jr.; Mark B. Quatt; L. George Legg

[57] ABSTRACT

Films of thermoplastic material may be sealed together by application of a radio frequency field through a pair of oppositely positioned electrodes. Preferred thermoplastic materials have a low dielectric dissipation factor, and such materials include polyethylene. The sealing apparatus includes a circuit having compensation and matching circuits for providing resonant operation and minimizing the amount of reflected energy from the electrodes. Through the use of this invention effective RF sealing is produced between films of thermoplastic material having a low dielectric dissipation factor. Further the sealing apparatus preferably includes at least one electrode coated with a ceramic and a release material for providing thermal conduction to the films, thereby enhancing the sealing effectiveness of the apparatus.

36 Claims, 4 Drawing Sheets

U.S. PATENT DOCUMENTS

| | | | |
|---|---|---|---|
| 4,124,430 | 11/1978 | Peterson | 156/380 |
| 4,147,488 | 4/1979 | Chiron | 425/174 |
| 4,150,927 | 4/1979 | Steingroever | 425/3 |
| 4,163,884 | 8/1979 | Kobetsky . | |
| 4,205,210 | 5/1980 | Salway-Waller et al. . | |
| 4,268,338 | 5/1981 | Peterson | 156/251 |
| 4,285,346 | 8/1981 | Armitage | 128/442 |
| 4,309,586 | 1/1982 | Ishibashi . | |
| 4,356,458 | 10/1982 | Armitage | 333/17 M |
| 4,373,581 | 2/1983 | Toellner | 333/32 |
| 4,420,670 | 12/1983 | Croswell et al. . | |
| 4,443,679 | 4/1984 | Balordi . | |
| 4,458,128 | 7/1984 | Chabinsky . | |
| 4,504,720 | 3/1985 | Krause . | |
| 4,574,173 | 3/1986 | Bennett . | |
| 4,574,413 | 3/1986 | Otting et al. | 8/149 |
| 4,629,851 | 12/1986 | Holle . | |
| 4,857,129 | 8/1989 | Jensen et al. | 156/273 |
| 4,951,009 | 8/1990 | Collins | 333/17 |
| 4,954,678 | 9/1990 | Harmony et al. . | |
| 4,992,133 | 2/1991 | Border | 156/490 |
| 5,010,220 | 4/1991 | Apte et al. . | |
| 5,195,045 | 3/1993 | Keane et al. | 364/482 |

APPARATUS AND METHOD FOR RADIO FREQUENCY SEALING THERMOPLASTIC FILMS TOGETHER

CROSS-REFERENCE TO RELATED APPLICATIONS

This application is a continuation-in-part of copending application Ser. No. 871,928, filed Apr. 21, 1992, to Joseph R. Lovin and commonly assigned, which is a continuation-in-part of application Ser. No. 805,350, filed Dec. 9, 1991, to Joseph R. Lovin and commonly assigned, now abandoned.

FIELD OF THE INVENTION

The present invention relates to an apparatus and method for sealing together multiple layers of dielectric films and, more particularly, to a radio frequency sealing apparatus and method for sealing thermoplastic films.

BACKGROUND OF THE INVENTION

Storage containers, such as pouches or bags, in particular for medical purposes such as intravenous solutions, blood and plasma bags and the like are used in the millions and are typically made from thermoplastic film materials sealed at their sides or ends. The thermoplastic film materials are typically sealed together using a variety of heat sources including, for example, impulse heaters and electrical resistance heaters. Impulse heaters and electrical resistance heaters are used for sealing a wide range of thermoplastic materials. Unfortunately, impulse heaters and electrical resistance heaters are unable to dissipate heat very rapidly and, therefore, there is no real cooling cycle and the thermoplastic material cannot be held under cold pressure until the seal sets.

Another type of sealing is achieved through dielectric welding or sealing techniques. Such techniques may include the dielectric heating of multiple layers of thermoplastic film in order to melt and seal adjacent layers together. The electric current may be supplied by a pair of electrodes positioned in opposing relationship above and below the films to be sealed. Typically, these electrodes are powered by a radio frequency electrical signal. Radio frequency is abbreviated herein as RF.

Generally, the conventional method for forming seals in thermoplastic films includes a sealing cycle having multiple phases. First, there is a positioning phase wherein at least two layers of thermoplastic material or film are positioned in superposed relation between the top and bottom electrodes. Typically, the top electrode is a metallic electrode formed in the shape of the desired sealing pattern and the bottom electrode formed as a metal platen of a pneumatically operated press.

During the contacting phase, the electrodes are brought together in contact with the films.

Upon contact, RF energy is applied to the electrodes and causes heating and softening or melting of the films in the region defined by the shape of the top electrode. The flow of RF energy constitutes the heating phase, and in a conventional apparatus, involves only dielectric loss heating generated within the films until a seal is formed. The metallic electrode and metal platen do not become hot from the influence of the high frequency energy and instead draw heat from the material being sealed.

Once sufficient melting or softening of the films has occured, the RF power to the electrodes is interrupted to allow for cooling and resolidifying of the films in or near the region defined by the top electrode. At this phase, each electrode acts as a thermal heat sink for the heated films and resolidifying under pressure provides a good seal.

Finally, during the release phase, the electrodes are separated and the films, now sealed, are removed.

Sealing thermoplastic film materials with electromagnetic energy at radio frequencies has the advantage of rapid cooling, but RF use has been limited to sealing of those materials having a certain dielectric dissipation factor as further discussed below.

The dielectric dissipation factor for a plastic film determines how much of the RF energy is converted into heat within the film. The dielectric dissipation factor is a function of the material's dielectric constant and the loss tangent (tan $\delta$, where $\delta = 90° - \theta$, and where $\theta$ is the phase angle) defined as $\sigma/\omega\epsilon_f$, where $\sigma$ is the film's electrical conductivity, $\omega$ is the frequency of operation, and $\epsilon_f$ is the film's electrical permittivity. Electrical permittivity is another name for dielectric constant.

The use of films having relatively high dielectric dissipation factors (0.04–0.10), referred to herein as "high loss films", is generally preferred in conventional dielectric sealing because these films form a dielectrically lossy load and become hot and melt when subjected to RF energy. Examples of high loss films include, for example, films made from polyurethane polymer resin, vinylidene chloride copolymer resin, and polyvinyl chloride polymer resin (PVC). In contrast, films having a dielectric dissipation factor below 0.04, herein referred to as "low loss films", generally have poor heat generating characteristics and cannot be readily or satisfactorily sealed when subjected to heating by RF energy alone.

It is recognized that high loss films such as films made from polyurethane polymers are desirable materials for medical applications, but are often not used in medical applications due to their high cost. Other high loss films such as those made of PVC type polymers, for example, are also used for medical applications but it is desired to do away with them because of concerns that they contain chlorine ions which pose an environmental risk when disposed of. Another concern is that PVC films suffer from plasticizer migration over time, and thus the plasticizer could leach into a solution contained in a PVC container thereby contaminating the solution. These solutions are typically intended for injection into a human; so if contaminated, the solution cannot be used.

Low loss films, such as those of polyethylene, polypropylene, and linear low-density polyethylene, on the other hand, do not have these adverse characteristics, but are generally poor candidates for conventional dielectric sealing because of their low loss characteristics. It is therefore desirable for a sealing apparatus to be capable of sealing low loss films at high speed and with the seal quality attendant high loss films.

However, known apparatuses for dielectric sealing have not been able to seal low loss films because heat generated in such film when subjected to an RF field is insufficient to cause the film to soften or melt. It has been found that this limitation of a conventional apparatus is dependent upon the electrode utilized in the sealing apparatus as well as the inefficient design of the apparatus.

A major source of energy inefficiency in a sealing apparatus for low loss films is the source-to-load impedance mismatch which arises between the RF signal generator and the sealing electrodes. For example, when an RF signal generator is imperfectly coupled to the sealing electrodes via a transmission line a portion of the load-directed power ("$P_{ld}$") can be reflected back towards the signal generator or become source-directed ("$P_{sd}$"). It is known that imperfect coupling can substantially increase the power dissipated in the signal generator and thereby reduce its life span and efficiency.

The maximum efficiency of power transfer to the sealing electrodes will occur when the transmission coefficient $\tau$ is maximized. The transmission coefficient can be expressed according to the following relationship:

$$\tau = 2Z_{12}/(Z_{12}+Z_0) \qquad (1)$$

Where, $Z_{12}$ is the input impedance of the sealing electrodes and $Z_0$ is the impedance of the transmission line.

The speed by which films can be sealed is directly related to the magnitude of the voltage ("$V_e$") developed across the electrodes and intervening plastic films during the sealing cycle. This voltage should be as high as possible without causing breakdown of the films. Moreover, the magnitude of $V_e$ is a function not only of $\tau$, but also of the energy stored in passive components, such as any inductors or capacitors connected to the electrodes. It is therefore preferable that a sealing apparatus be capable of operating at or near the maximum $V_e$ possible.

Conventional apparatus for sealing high loss thermoplastic films include, for example, sealing electrodes connected in parallel with a compensation inductor, or in series with a compensation inductor as described in U.S. Pat. No. 4,629,851 to Holle. These parallel or series connected components may cause $V_e$ to reach a maximum value at a specified point in the sealing cycle; however, because the effective capacitance of the electrodes changes during the sealing cycle, optimum sealing efficiency is not obtained using these conventional configurations since $V_e$ cannot be maintained at its maximum value throughout the entire cycle.

It is an object of the invention to provide an apparatus and method for radio frequency sealing thermoplastic films together.

It is another object of the invention to provide a radio frequency sealing apparatus and method capable of sealing thermoplastic material having a dielectric dissipation factor near or below 0.04.

It is a further object of the invention to provide a radio frequency sealing apparatus and method being impedance matched to the radio frequency generator and operable with low reflected power.

It is a still further object of the invention to provide an improved electrode to be utilized in a sealing apparatus and method for radio frequency sealing two or more films of thermoplastic material together in arbitrary shapes.

Therefore, according to one aspect of the invention, there is provided an apparatus for sealing two or more films of thermoplastic material together comprising: a first and a second electrode adapted for receiving and contacting said films therebetween; generating means electrically connected to said first and second electrodes for supplying radio frequency power to said electrodes; and matching means connected between said generating means and said electrodes for impedance matching said generating means to said electrodes.

According to another aspect of the invention, there is provided an apparatus for sealing two or more films of thermoplastic material together comprising: a first and a second electrode adapted for receiving and contacting said films therebetween; generating means electrically connected to said first and second electrodes for supplying radio frequency power to said electrodes and including means for measuring said radio frequency power delivered to said electrodes.

According to yet another aspect of the invention, there is provided an electrode for use in an apparatus for radio frequency sealing thermoplastic films together, said electrode having a coating of ceramic material.

According to a further aspect of the invention, there is provided a method of sealing two or more films of thermoplastic material together comprising steps of: positioning said films in superposed relation between a first and a second electrode; pressing said films together with said first and second electrodes, where at least one of said electrodes has a coating of ceramic material contacting said films; supplying radio frequency power to said electrodes thereby generating dielectric heating and conductive heating of said films; and removing said radio frequency power while maintaining pressure of said electrodes on said films until said thermoplastic material has cooled sufficiently to set whereby a seal is formed.

According to a still further aspect of the invention, there is provided a method of sealing two or more films of thermoplastic material together comprising steps of: positioning said films in superposed relation between a first and a second electrode; pressing said films together with said first and second electrodes; supplying radio frequency power to said electrodes thereby generating dielectric heating of said films; measuring said radio frequency power delivered to said electrodes and controlling said radio frequency power to produce a readily reproducible seal.

In view of the undesirable characteristics of certain thermoplastic materials such as polyvinyl chloride, which use plasticizers in the films, for making medical supply bags and the undesirable heating cycle of impulse heaters and resistance heaters when sealing, it is desirable to use other thermoplastic materials and sealing methods to make medical supply bags.

The radio frequency sealing method and apparatus of this invention are especially useful in the construction of medical containers, such as collection bags, intravenous solution bags, blood and plasma bags, and the like. According to the present invention, thermoplastic materials with a low dielectric dissipation factor may be sealed together with RF energy using the RF electrode of this invention. One example of a preferred thermoplastic material having a low dielectric dissipation factor for use in this invention is polyethylene.

In one particular embodiment, the apparatus of the present invention comprises a ceramic coated top electrode having the shape of the seal to be formed and a bottom electrode for sealing low loss thermoplastic films. The ceramic coating acts as an intermediate dielectric layer between the films and top electrode, when compressed. When exposed to RF energy, the ceramic coating becomes hot and provides thermal conduction to the low loss films. In addition, the heating by thermal conduction also increases the loss properties of the films. Although it is not intended to be bound to any theory, it is believed that the thermal conduction from the hot ceramic coating acts synergistically with the heat generated from within the low loss films and is sufficient to melt the films and form a seal. In embodiments wherein only one of the electrodes includes a ceramic coating, a thermal insulating layer can be provided on the uncoated electrode to prevent that electrode from acting as a heat sink to the films during the heating phase.

The improved electrode of this invention may be made from a metal selected from the group consisting of the transition metals, Group III A metals, or combinations thereof, such as tungsten carbide, aluminum, copper, or brass. The electrode is coated with a ceramic oxide selected from the group consisting of transition metal oxides, Group III A metal oxides, or combinations thereof, and preferably is aluminum oxide. Then, the transition metal oxide or Group III A metal oxide is coated with a release material, and preferably the release material is selected from the group consisting of silicone, polytetrafluoroethylene or combinations thereof.

The apparatus of the present invention preferably includes a compensation circuit connected in parallel with the electrodes for providing a negative reactance and maintaining the overall reactance seen by the electrodes at a near constant value throughout the sealing cycle even though the capacitance of the electrodes ("$C_e$") increases as the films are compressed.

A matching circuit is also interposed with the electrodes. The elements of the matching network may be interconnected with the electrodes in a variety of configurations, such as parallel or series-parallel, to achieve the desired results. This circuit provides a sufficient positive reactance to cause resonance and matches the impedance to the characteristic impedance of the signal line and the signal generator. Typically, the signal line is a coaxial transmission line having a characteristic impedance in the range of 50–300 ohms. The range of 50–300 ohms is characteristic of commercial coaxial transmission lines. Thus, it is not intended to be limited thereby, as other ranges of impedance may be typical of other lines.

The method for making seals between thermoplastic films according to the invention includes positioning at least two thermoplastic films in superposed relation between a first electrode and a second electrode with at least one of the electrodes having a ceramic coating thereon. A radio frequency signal is applied to the electrodes to thereby both dielectrically heat the thermoplastic films and conductively heat same by heat generated within the ceramic coating. The power delivered by the electrodes may be advantageously measured and controlled thereby to produce a readily reproducible seal.

Because of the impedance matching, it is now possible to measure the power. Measuring allows for monitoring, and monitoring is desirable in order to obtain accurate statistical data about the quality of the seals formed in low loss material. The RF monitoring of the forward and reflected power may be continuously measured using a bi-directional coupler, for example. Thus, with the instant invention the sealing cycle efficiency can be controlled and electrical arcing through the films to be sealed can be prevented. Accurate control of sealing cycle efficiency cannot be obtained with conventional RF sealing devices.

The present invention will be more fully understood from the following description when taken in conjunction with the accompanying drawings, in which.

The present invention will be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete and will fully convey the scope of the invention to those skilled in the art.

Figure 1:
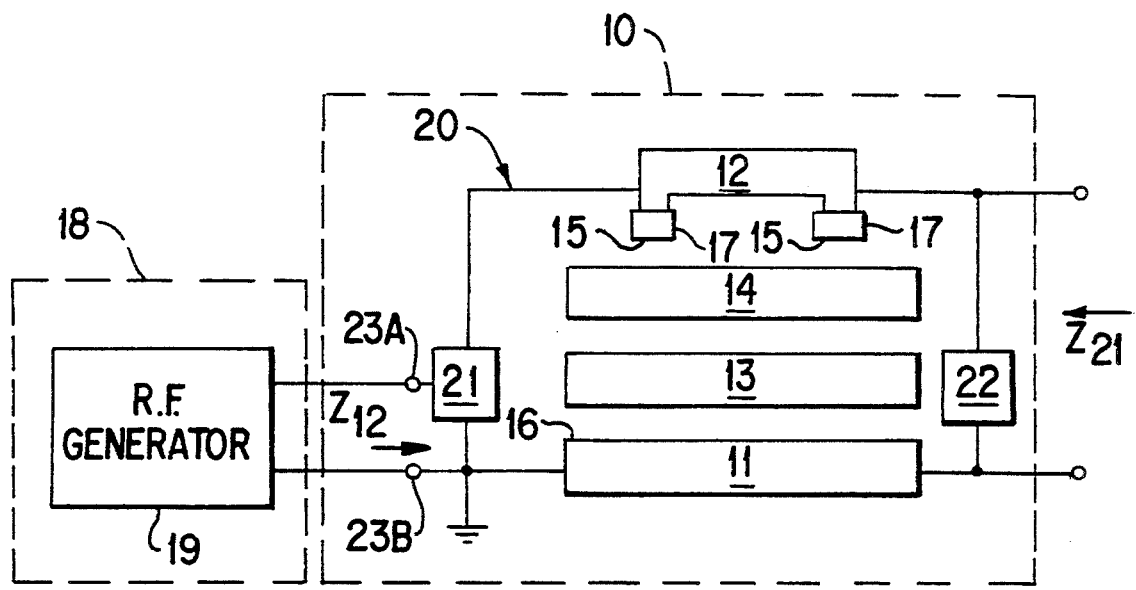
FIG. 1 is a block diagram of a sealing apparatus according to the present invention.

Referring to FIG. 1, a dielectric sealing apparatus according to the present invention will now be described. The sealing apparatus 10 includes a first electrode 11 and second electrode 12 positioned in opposing spaced apart relation for receiving at least two thermoplastic films 13 and 14 therebetween. In addition, surface contact areas 15 and 16 are provided for contacting films 14 and 13, respectively.

The first electrode 11 acting as a ground electrode such as a metal platen, formed from, for example, brass or aluminum, is mounted on a support (not shown). The second electrode 12 may be shaped in the form of an article to be made such as the medical bag shown in FIG. 4. The second electrode is mounted for reciprocating movement so that it can be pneumatically, mechanically or hydraulically raised and lowered by an actuation means. After the films 13, 14 are inserted into sealing apparatus 10, the upper electrode 12 is moved to press down against films 13, 14 during the sealing operation. It will be understood by one skilled in the art that while the second electrode 12 is shown with a surface contact area 15 for contacting the top film 14 and defining the shape of the seal therein, the first electrode 11 may also be so configured instead of being planar, as shown.

The electrodes in an RF sealing device are normally chosen to have high electrical conductivity to achieve uniform distribution of the applied RF field. The electrode 12 of this invention is made of a transition metal, preferably aluminum, to effect good RF conductivity. It should be understood, however, that brass or copper may be used in place of aluminum. The electrode surface is coated with about 1–150 micron, preferably 20–130 micron, more preferably 40–110 micron, thickness of a thin hard ceramic coating 17 of a transition metal oxide, Group III A metal oxide or combinations thereof, preferably aluminum oxide. The aluminum oxide coating preferably has a Rockwell hardness of between 60–70 on the Rockwell C Scale. Rockwell hardness is the hardness of a material expressed as a number derived from the net increase in depth of impression as the load on an indentor is increased from a fixed minor amount to a major load and then returned to the minor load. As specified in ASTM D 785, the minor load is fixed at 10 kg. Various scales, depending on the diameter of the ball indentor and the major load, are used. The electrode surface coating 17 is achieved by methods known in the art. For instance, the aluminum electrode to be coated is dipped into a bath. Both the electrode to be coated and the bath are connected to a DC power supply. Current is applied, as a result of which some of the aluminum reacts with the bath to form an aluminum oxide coating. Other coating methods are also known in the art such as soldering or brazing an oxide onto an electrode to be coated.

The thus coated electrode may then be impregnated with a material to prevent sticking between the bonded thermoplastic material and the electrode. A particularly suitable material is polytetrafluoroethylene, also known as Teflon, a registered trademark of DuPont. Methods of impregnating the nonsticking material are well known to those skilled in the art.

The aluminum oxide coating along with the polytetrafluoroethylene impregnated affords excellent insulation characteristics (600 to 2,000 volts/mil. dielectric strength) as well as unsurpassed release properties. The electrode of this invention allows uniform distribution of the RF field and the aluminum oxide coating is an RF susceptor and therefore becomes very hot. Sufficient heat can be generated with this electrode to cause thermoplastic material having dissipation factors as low as 0.0002 to readily seal. Dissipation factor is defined as the tangent of the loss angle. The product of the dissipation factor and the dielectric constant is a measure of the energy dissipated in the dielectric medium.

Layers of electrical tape have been used on conventional electrodes in the prior art to prevent the films from sticking to the electrodes during the heating phase and reduce electrical arcing from one electrode to another through pinholes in defective films. Unfortunately, over time, these tape layers are compressed as a result of repeated contact with the films. As will be understood by one skilled in the art, the resultant change in thickness has the effect of increasing $C_{eave}$ ($C_e$ average) and if substantial, prevents resonant operation for a fixed tuned system.

In contrast, the ceramic coated electrode 12 of the present design is not so limited since the thickness of the ceramic coating 17 is incompressible and thus remains constant at all times. Moreover, the presence of a ceramic coating having dielectric properties substantially reduces the likelihood of electrode arcing or shorting and the detrimental effects resulting therefrom. Such detrimental effects include, for example, the reduced lifespan of the RF generator 19 providing the RF signal. To prevent sticking, both electrodes may be coated with a release material, not shown, containing silicone, polytetrafluoroethylene or combinations thereof.

In another embodiment of this invention the method of sealing may be further enhanced by using a thermally insulating material such as a polyvinylidene fluoride (PVDF) film placed on the ground electrode. PVDF has a high melting point (316° F.), high dielectric strength (1280 volts/mil), a moderate dissipation factor of 0.019 and a very high dielectric constant of 8.4. All of these properties allow high dielectric losses to occur in this sheet of material which enhances the system sealing capability even further and also provides thermal insulation of the seal area from the ground electrode. This sheet of film is typically 2-3 mils (50-151 microns). The material due to its high melt temperature and mechanical toughness will withstand repeated cycling in this application without degradation. Alternatively, PVDC material may be used. In yet another embodiment the ground electrode can be coated with Teflon* impregnated aluminum oxide and achieve a similar result to the PVDF sheet of film. It is understood that materials having equivalent properties may be used in place of PVDF.

The means for providing RF energy 18 for the sealing apparatus 10 may include an RF signal generator 19, such as a cavity oscillator, manufactured by the Callanan Company of Chicago, Ill., for example. Radio frequency (RF) generator 19 is operatively connected at its high voltage, or "hot" side, to electrode 12 and at its other, or "ground", side to the electrode 11. The RF field provided by generator 13 should have a frequency of at least about 10 Megahertz (MHz), preferably between 10 and 45 Megahertz. An RF frequency of 27 MHz has been found suitable.

A jaw circuit 20 is connected between sealing electrodes 11 and 12 and the RF generating means 18. The term "jaw circuit" is used to describe the sealing electrodes 11 and 12 (modelled as a parallel plate capacitor $C_e$ having a dielectric, i.e., the films 13 and 14, between the plates) and attached electrical components such as one or more inductors and capacitors which control the electrode potential $V_e$ and electrically connect the electrodes to the RF signal generating means 18. This circuit can comprise, for example, a matching circuit 21 having input terminals 23A,B and a compensation circuit 22, as described more fully below. In the preferred embodiment, as shown in FIG. 1, jaw circuit 20 is in parallel with matching circuit 21.

Figure 2:
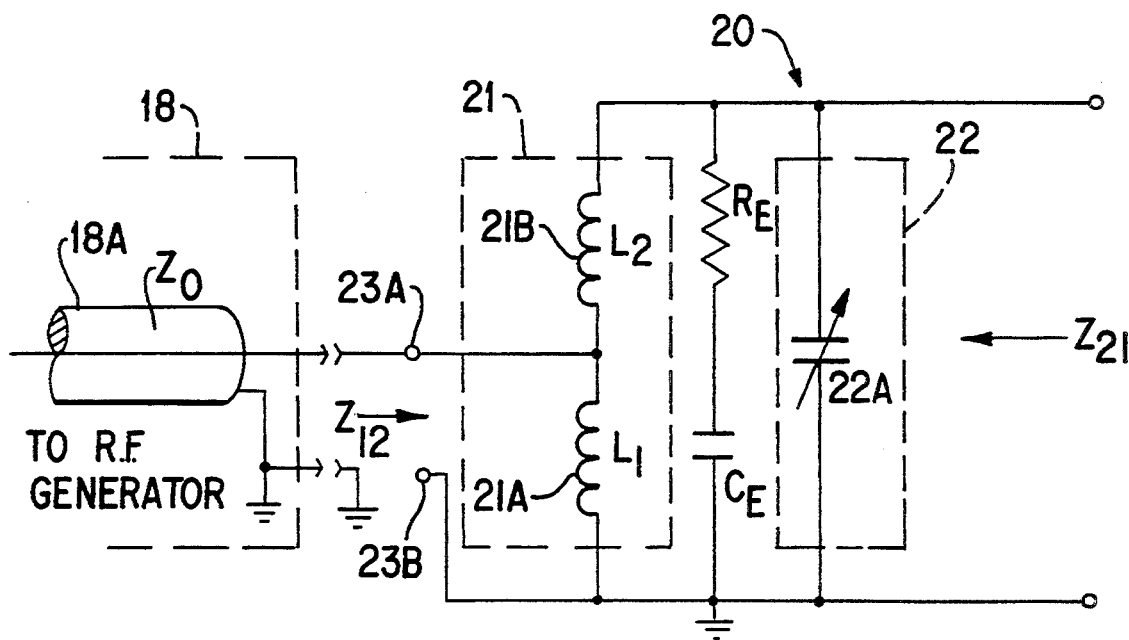
FIG. 2 is a schematic diagram of the sealing apparatus as shown in FIG. 1.

$Z_{12}$ and $Z_{21}$ represent the jaw circuit input impedance (measured at terminals 23A,B) and the total jaw circuit impedance, respectively. Moreover, the amount of reflected power can be minimized by making the input impedance $Z_{12}$ equal to the characteristic impedance of the RF generating means 18. Stated alternatively, the magnitude of $Z_{12}$, expressed in polar form as a vector having $Z_{12}$ at impedance vector angle $\phi_{12}$ ($|Z_{12}| < \phi_{12}$), should equal or closely approximate the characteristic impedance $Z_0$ of the transmission line 18A (FIG. 2). In order to ensure rapid sealing, the jaw circuit 20 should operate at or near resonance whenever power is being supplied to the films. Resonance occurs when the net positive reactance of the matching circuit 21 equals the net negative reactance of the compensation circuit 22 in summation with the reactance of $C_e$. It is desirable for this mode of operation that the vector angle $\theta_{21}$ of $Z_{21}$ be not greater than about twenty (20) degrees, more preferably not greater than about fifteen (15) degrees, most preferably not greater than about ten (10) degrees.

To optimize the efficiency of the energy transferred from the RF signal generating means 18 to the films by reducing the amount of reflected power, the jaw circuit should be matched thereto. This can be accomplished, in part, by causing the jaw circuit 20 to resonate during most of the sealing cycle. Unfortunately, as the films are compressed during sealing, the capacitance of the electrodes $C_e$ increases. Therefore, to obtain optimum performance, the jaw circuit should be tuned to resonate when $C_e = C_{eave}$, where $C_{eave}$ is the average capacitance of the electrodes during the sealing cycle. Accordingly, the jaw circuit 20 will be tuned to an optimum value for only a fraction of the sealing cycle since $C_e$ varies about $C_{eave}$. If this fraction is sufficiently small, the average efficiency ("$\eta_{ave}$") of the energy transfer from the signal generating means to the films will be substantially below the optimum efficiency value $\eta_{opt}$.

According to one aspect of the present invention, $\eta_{ave}$ can be increased to be at or near the optimum value $\eta_{opt}$ by adding a compensation circuit 22 to the jaw circuit 20 in parallel to the electrodes. It will be understood by one skilled in the art that there may be added a compensation circuit 22 comprising a variable vacuum capacitor having capacitance ("$C_c$"), for example. The addition of 22 will "push" the average total jaw circuit capacitance ("$C_{tave}$") to at or near the value that causes optimum energy transfer if $C_c$ is made sufficiently large. In other words, once a compensation capacitor is added in parallel, the variation of $C_e$ during the heating phase of the cycle will have a significantly reduced effect upon the total jaw circuit capacitance $C_{tave}$. Moreover, $\eta_{ave}$ will approach $\eta_{opt}$ since the jaw circuit will now be tuned to the average total jaw circuit capacitance $C_{tave}$ which remains relatively constant throughout the sealing cycle.

The addition of the variable vacuum of a capacitor having capacitance $C_c$ will have negligible effect on the overall power consumed by the jaw circuit. This is because the impedance of the variable vacuum capacitor ("$Z_c$") is almost purely reactive and a purely reactive impedance consumes no power.

As shown in FIG. 2, the matching circuit 21 can be modelled as a first inductor $L_1$ 21A and a second inductor $L_2$ 21B connected together in series at a node. This node corresponds to the input terminal 23A of the jaw circuit. The total jaw circuit impedance $Z_{21}$ and input impedance $Z_{12}$ are related according to the following expression:

$$Z_{12} = Z_{21}[L_1^2/(L_1+L_2)^2] \quad (2)$$

Consequently, whereas the summation of $L_1$ and $L_2$ control the resonant operation of the jaw circuit by controlling the impedance of the matching circuit, the size of $L_1$ in relation to the sum $(L_1+L_2)$ determines the degree of impedance matching between the signal generating means and the jaw circuit. In one embodiment, $L_1$ and $L_2$ can be provided by an autotransformer having an adjustable tap point for controlling the size of $L_1$ in relation to $(L_1+L_2)$. In this embodiment the tap point is connected to the input terminal 23A.

Since the signal generating means 18 is properly terminated at the jaw circuit 20, no portion of the incident RF signal will be reflected back towards the RF generator 19 and the energy transferred will be maximized. Although this ideal situation is difficult to achieve, it is possible to reduce the portion of reflected power by minimizing the signal reflection coefficient $\rho$ at the input terminal 23A. The signal reflection coefficient $\rho$ is defined by the relation:

$$\rho = (Z_{12} - Z_0)/(Z_{12} + Z_0) \quad (3)$$

where $Z_0$ is the characteristic impedance of the signal line 18A. The reflection coefficient $\rho$ can be minimized by adjusting $L_1$ according to equation (2) so that the jaw circuit input impedance $Z_{12}$ equals the characteristic impedance of the signal line $Z_0$, for a given $Z_{21}$.

Figure 3:
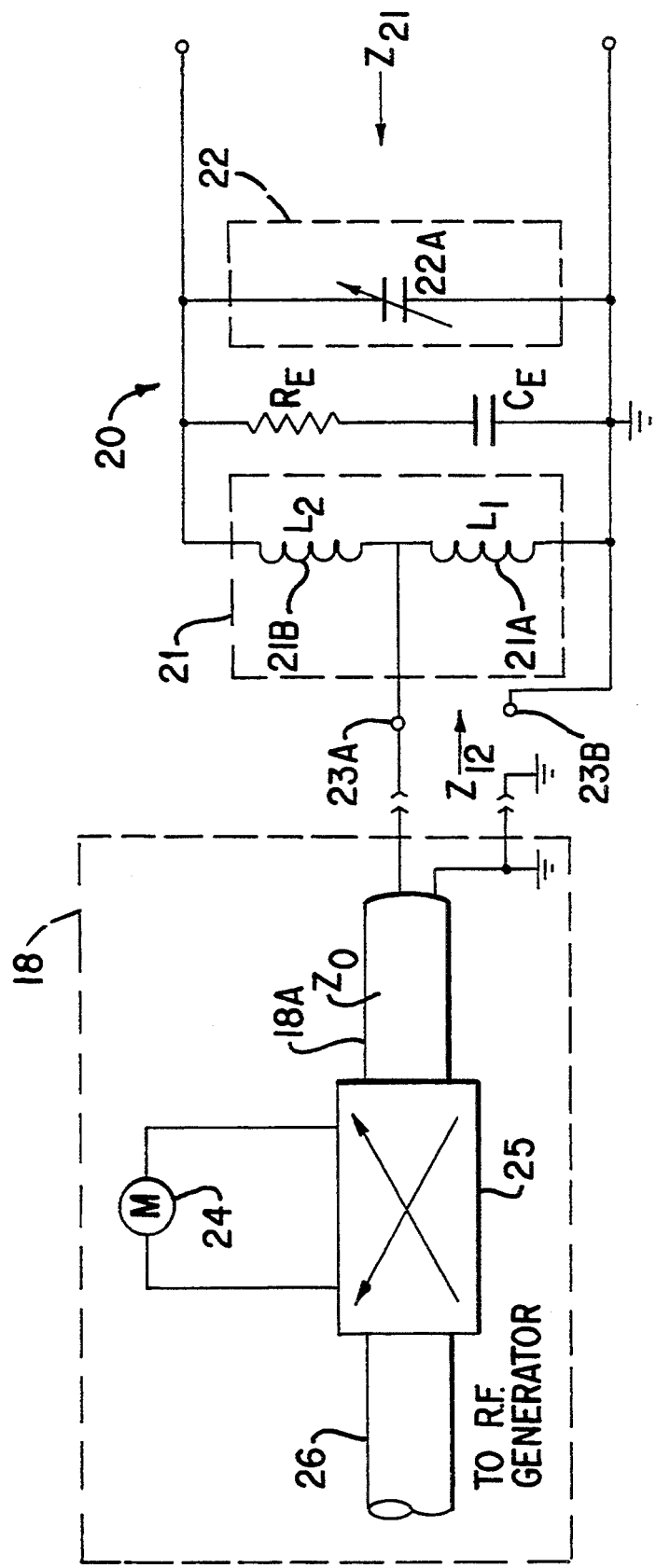
FIG. 3 is a schematic diagram of an embodiment of the sealing apparatus according to the present invention including a bi-directional coupler and power meter for monitoring the forward and reflected power.

Referring now to FIG. 3, the RF generating means 18 preferably includes a bi-directional coupler 25 such as a BIRD Model 4712 bi-directional coupler and a directional power meter 24. These two components can be used to measure the amount of forward and reflected power and hence, accurately determine the amount of power delivered by the electrodes 11 and 12. In addition, instances of impending electrical arcing across the electrodes can be monitored. The bi-directional coupler 25 also provides a means for obtaining accurate statistical information about the amount of power transferred. Measuring the power allows one to develop statistical quality control charts. The data on these charts can then be compared to data obtained about seal quality that has been generated by a laboratory technician taking measurements on a seal. Then, the data on the measured seal quality can be compared against the actual power received by the thermoplastic films during sealing to set the power at the level where optimum seals are obtained.

In the preferred embodiment, the first inductor $L_1$ 21A and the second inductor $L_2$ 21B each have an inductance in the range of about 0.15 to 0.50 $\mu H$ (microhenries), for example. The compensation circuit 22 is shown comprising an adjustable parallel plate capacitor 22A.

Figure 4:
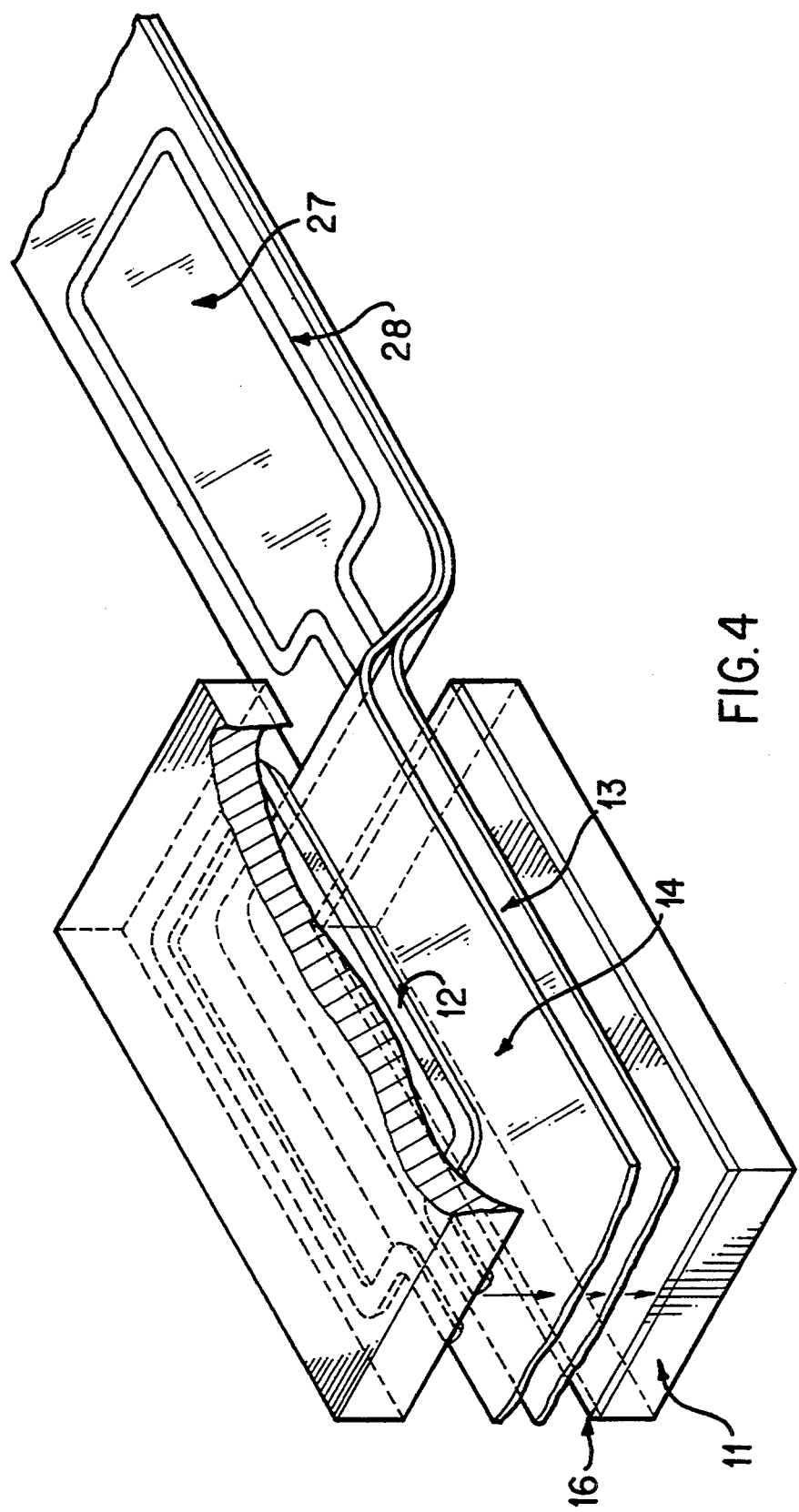
FIG. 4 is a perspective view showing the position of the sealing electrodes and thermoplastic films prior to sealing for a continuous process.

During a continuous process, the sealed bag 27 is removed from the sealing apparatus after each cycle and the films 13 and 14 are again positioned for sealing, as shown in FIG. 4. As will be understood by one skilled in the art, each bag 27 can be removed for individual use by cutting along the line 28.

For purposes of the present invention, the low loss material is one that has a dielectric dissipation factor which is so low that it is unsuitable for sealing using conventional RF sealing equipment, generally less than about 0.04 or lower. Many thermoplastic materials with a dielectric dissipation factor as low as 0.0002 will RF seal with the instant invention. One class of preferred low dielectric dissipation factor materials which can be used to make the medical bags include polymers of olefins, such as ethylene, propylene, butylene, and the like. Other low loss materials include, for example, PVDF (sold by DuPont under the registered trademark Tedlar), bonding temperature of 400°-425° F. (204°-218° C.), spun bonded polyethylene (sold by DuPont under the registered trade-mark Tyvek) having a melting temperature of 275° F. (135° C.), polyetheretherketone (PEEK) having a bonding temperature in excess of 334° C., polypropylene, polyester, some polyamides (polyamides are commonly known as nylons), particularly some nylon 66, linear low density polyethylene, polystyrene, high density polyethylene and the like and combinations thereof. Typical thicknesses of sheets of these thermoplastic films are about 1 to 20 mils (25 to 508 microns).

The method for forming a seal in low loss thermoplastic films differs from conventional methods by enhancing the dielectric heating of the films. Thermal conduction is provided by at least one of the electrodes to the films thereby increasing the rate of heating and melting. Thermal conduction from an electrode may even be necessary to initiate dielectric heating from within the films for very low loss materials. Thus, a method for making seals in thermoplastic films according to the present invention includes the steps of positioning the layers of film in superposed relation between the first and second electrodes, 11 and 12. The electrodes are closed to contact the films 13 and 14 and the films are compressed in the shape of the seal to be formed. Radio frequency energy is then applied to the electrodes to establish an RF field in the films in or near the region defined by the electrodes. In addition to causing some dielectric heating in most low loss films, thermal conduction from the electrodes—caused by the presence of the ceramic coating 17—enhances the degree and rate of heating and melting in the films in a synergistic fashion. Once the seal is formed, the RF energy to the electrodes is momentarily shut-off to allow the seal to cool, in part, by thermal conduction into the electrode. The electrode acts as a heat sink during this phase of operation. Finally, the electrodes are opened and the films, now sealed, are removed. Preferably the power delivered to the electrodes is measured so that a readily reproducible seal is obtained. The power delivered is preferably determined based upon forward and reflected power at the RF generator. In addition, the impedance between the RF generator and the electrodes is preferably matched as described in greater detail above.

The apparatus according to the present invention provides an efficient means for sealing low loss thermoplastic films using preferably both dielectric heating and thermal conduction from a ceramic coated electrode. Moreover, because the ceramic coating acts as an intermediate dielectric, the propensity for electrode arcing through pinholes in defective films is reduced. A compensation and matching circuit are provided to enhance sealing efficiency by maximizing the voltage appearing across the electrodes during sealing. The matching circuit matches the jaw circuit impedance to the characteristic impedance of the transmission line. Because of the efficient matching, there is little reflected power and the lifetime of the RF generator is thereby increased. Of course, this apparatus according to the present invention could also be used to seal high loss films. Because of the advantages described above, use with high loss films requires less power than would a conventional RF sealing apparatus used with high loss films thereby saving time and money.

Figure 5:
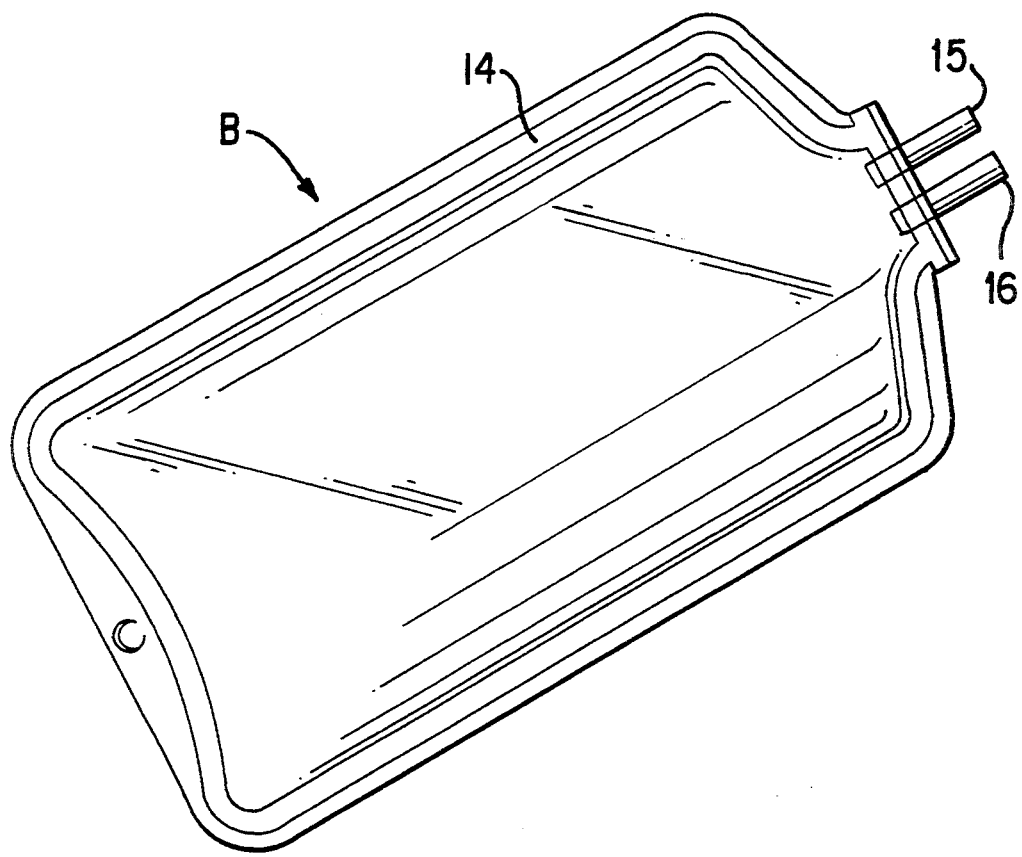
FIGS. 5 and 6 show a fluid storage bag made according to the RF sealing method of this invention.
Figure 6:
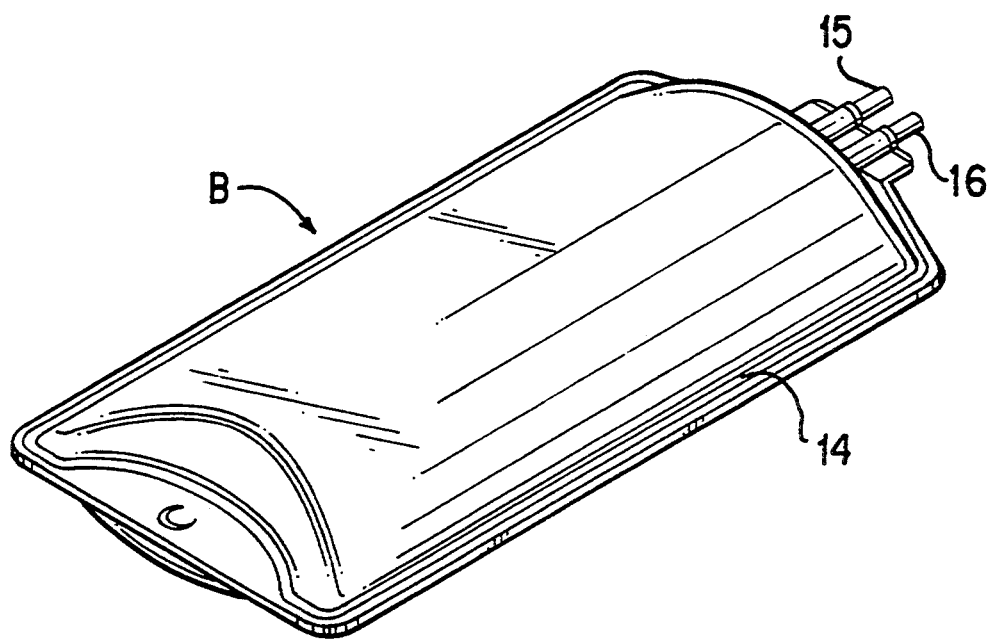

Also, it is noted that for illustrative purposes, the bag 27 of FIG. 4 is shown, after removal from the sealing apparatus and cutting along line 28, in FIGS. 5 and 6. It is illustrated as fluid storage bag B, for medical purposes, which is formed by RF sealing of the peripheral portion 14 of two thermoplastic sheets $P_1$, $P_2$ according to the method of this invention. At one end of the medical storage bag are provided tubes 115, 116.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. An apparatus for sealing two or more thermoplastic films together comprising:
    a first electrode and a second electrode adapted for receiving and contacting said films therebetween;
    generating means electrically connected to said first and second electrodes for supplying radio frequency power to said electrodes; and
    a matching circuit and a compensation circuit connected between said generating means and said electrodes for impedance matching said generating means to said electrodes;
    said matching circuit having no tuning element and being electrically connected with said electrodes and having a net positive reactance; and
    said compensation circuit being electrically connected in parallel with said electrodes and comprising a variable capacitor for tuning the sealing apparatus and thereby optimizing energy transfer from said generating means to said films, and having a net negative reactance.

2. An apparatus as claimed in claim 1, wherein a summation of said net negative reactance of said compensation circuit and a reactance of said first and second electrodes is substantially equal to said net positive reactance of said matching circuit.

3. An apparatus as claimed in claim 1, wherein said matching circuit comprises a first and a second inductor connected together in series and said matching circuit being connected in parallel across said first and second electrodes.

4. An apparatus as claimed in claim 1, wherein said matching circuit comprises an autotransformer connected in parallel across said first and second electrodes.

5. An apparatus as claimed in claim 1, wherein at least one of said first and second electrodes has a coating of ceramic material where contacting said films.

6. An apparatus as claimed in claim 5, wherein said ceramic material is selected from a group consisting of transition metal oxides, Group III A metal oxides and combinations thereof.

7. An apparatus as claimed in claim 6, wherein said coating of ceramic material is an aluminum oxide coating.

8. An apparatus as claimed in claim 7, wherein said aluminum oxide coating has a Rockwell hardness of from 60 to 70 on the Rockwell C scale.

9. An apparatus as claimed in claim 5, wherein said coating of ceramic material is coated with a release material.

10. An apparatus as claimed in claim 5, wherein said coating of ceramic material has a thickness of from 1 to 150 microns.

11. An apparatus as claimed in claim 5, wherein a thermally insulating material is placed on which electrode of said first and second electrodes not having a coating of ceramic material.

12. An apparatus as claimed in claim 11, wherein said thermally insulating material is polyvinylidene fluoride.

13. An apparatus as claimed in claim 5, wherein at least one of said first and second electrodes is made from a metal selected from a group consisting of transition metals, Group III A metals and combinations thereof.

14. An apparatus as claimed in 13, wherein said metal is selected from a group consisting of tungsten carbide, aluminum, copper and brass.

15. An apparatus as claimed in claim 1, wherein at least one of said first and second electrodes is made from a metal selected from a group consisting of transition metals, Group III A metals and combinations thereof.

16. An apparatus as claimed in claim 15, wherein said metal is selected from a group consisting of tungsten carbide, aluminum, copper and brass.

17. An apparatus for sealing two or more films of thermoplastic material together comprising:
    a first and a second electrode adapted for receiving and contacting said films therebetween; and
    generating means electrically connected to said first and second electrodes for supplying radio frequency power to said electrodes and including means for measuring said radio frequency power delivered to said electrodes.

18. An apparatus as claimed in claim 17, wherein said means for measuring said radio frequency power delivered to said electrodes comprises a bi-directional coupler electrically connected between said generating means and said electrodes and having a power meter connected to said bi-directional coupler.

19. An apparatus as claimed in claim 17, further comprising matching means connected between said generating means and said electrodes for impedance matching said generating means to said electrodes.

20. An apparatus as claimed in claim 19, wherein said matching means further comprises a compensation circuit electrically connected in parallel with said electrodes and having a net negative reactance.

21. An apparatus as claimed in claim 20, wherein a summation of said net negative reactance of said compensation circuit and a reactance of said first and second electrodes is substantially equal to said net positive reactance of said matching circuit.

22. An apparatus as claimed in claim 19, wherein said matching means comprises a matching circuit electrically connected with said electrodes and having a net positive reactance.

23. An apparatus as claimed in claim 22, wherein said matching circuit comprises a first and a second inductor connected together in series and said matching circuit being connected in parallel across said first and second electrodes.

24. An apparatus as claimed in claim 22, wherein said matching circuit comprises an autotransformer connected in parallel across said first and second electrodes.

25. An apparatus as claimed in claim 17, wherein at least one of said first and second electrodes has a coating of ceramic material where contacting said films.

26. An apparatus as claimed in claim 25, wherein said ceramic material is selected from a group consisting of transition metal oxides, Group III A metal oxides and combinations thereof.

27. An apparatus as claimed in claim 26, wherein said coating of ceramic material is an aluminum oxide coating.

28. An apparatus as claimed in claim 27, wherein said aluminum oxide coating has a Rockwell hardness of from 60 to 70 on the Rockwell C scale.

29. An apparatus as claimed in claim 25, wherein said coating of ceramic material is coated with a release material.

30. An apparatus as claimed in claim 25, wherein said coating of ceramic material has a thickness of from 1 to 150 microns.

31. An apparatus as claimed in claim 25, wherein a thermally insulating material is placed on which electrode of said first and second electrodes not having a coating of ceramic material.

32. An apparatus as claimed in claim 31, wherein said thermally insulating material is polyvinylidene fluoride.

33. An apparatus as claimed in claim 25, wherein at least one of said first and second electrodes is made from a metal selected from a group consisting of transition metals, Group III A metals and combinations thereof.

34. An apparatus as claimed in claim 33, wherein said metal is selected from a group consisting of tungsten carbide, aluminum, copper and brass.

35. An apparatus as claimed in claim 17, wherein at least one of said first and second electrodes is made from a metal selected from a group consisting of transition metals, Group III A metals and combinations thereof.

36. An apparatus as claimed in claim 35, wherein said metal is selected from a group consisting of tungsten carbide, aluminum, copper and brass.

* * * * *